Jan. 11, 1955  M. C. OVERMAN  2,699,193
PNEUMATIC TIRE
Filed July 12, 1951
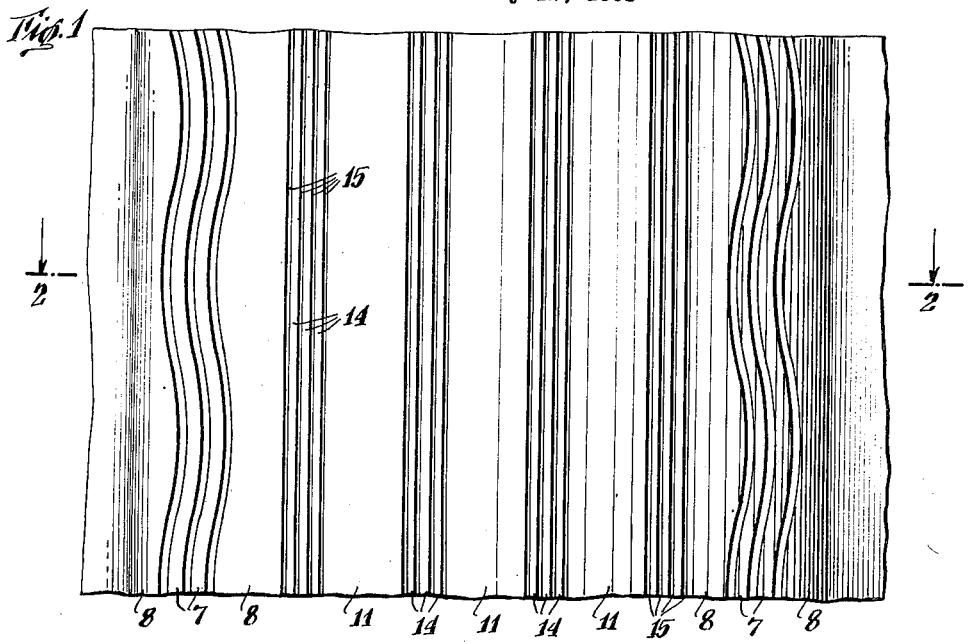
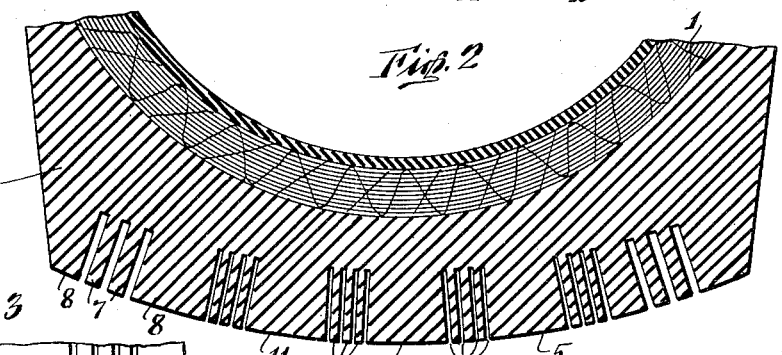
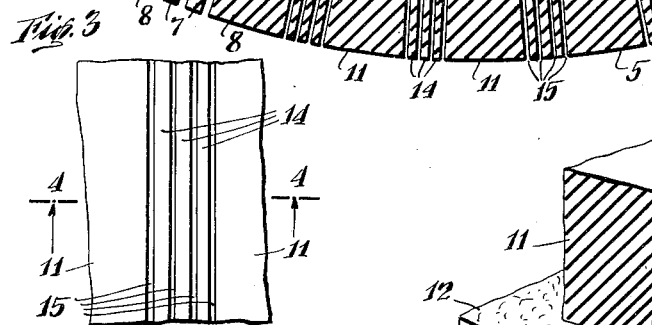
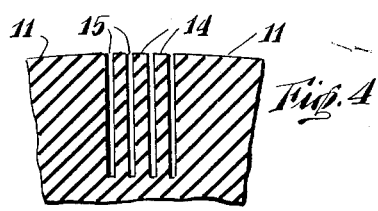
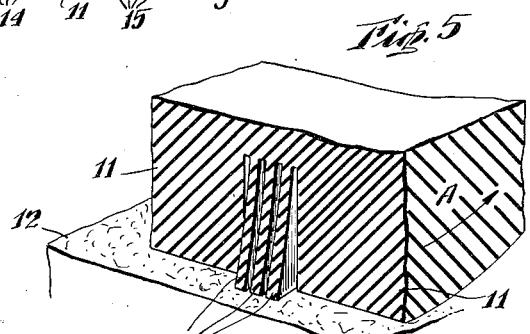
INVENTOR.
Max C. Overman
BY
Norman N. Holland
ATTORNEY United States Patent Office 2,699,193
Patented Jan. 11, 1955

2,699,193

PNEUMATIC TIRE

Max C. Overman, Westmoreland Depot, N. H., assignor to Cymax Corp., New York, N. Y., a corporation of New York Application July 12, 1951, Serial No. 236,371

1 Claim. (Cl. 152—209)

The present invention relates to pneumatic tires and more particularly to an improved tire adapted to reduce circumferential slippage and wear.

Continued improvement of highways and automobiles is accompanied by ever-increasing driving speeds. As driving speeds go higher, tire wear and gasoline consumption increase rapidly and hence more and more attention must be devoted to improvements of tires for longer wear and lower gasoline consumption.

When an automobile is traveling along a highway there is a continual tendency for the tires to slip circumferentially over the roadbed as they roll. This occurs all the time but is more noticeable at high speeds and over roadbeds which cause the tires to bounce up and down in and out of contact with the pavement and when a tire drops down into contact with the pavement the rubber tread tends to slip circumferentially over the pavement. The pavement is abrasive and tends to rapidly wear away the rubber during this circumferential slippage.

The present invention aims to provide an improved tire which minimizes circumferential slippage and wear, which contributes toward lower gasoline consumption, and which may be readily incorporated into tires during their manufacture.

An object of the present invention is to provide an improved tire having enhanced wearing properties.

Another object of the invention is to provide an improved tire which contributes toward lower gasoline consumption.

Another object of the invention is to provide a tire which is adapted to minimize circumferential slippage during usage.

Still another object of the invention is to provide means for minimizing circumferential slippage, which may be readily incorporated into automobile tires during manufacture thereof.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a fragmentary plan view showing a portion of a tire embodying the present invention.

Fig. 2 is a fragmentary sectional view taken along line 2—2 of Fig. 1.

Fig. 3 is an enlarged fragmentary view showing a portion of the tire illustrated in Figs. 1 and 2.

Fig. 4 is a fragmentary sectional view taken along line 4—4 of Fig. 3; and

Fig. 5 is an enlarged fragmentary view illustrating the action of a portion of the tire when subjected to a circumferential slippage over a roadbed.

In Figs. 1 and 2 there is shown a tire of the general type disclosed in my prior Patent No. 2,501,828, but embodying, in addition, the improvements of the present invention. The tire comprises an inner portion 1 comprising a suitable number of fabric layers and an outwardly disposed thickness of rubber 4. The rubber portion is shown provided with grooves, ribs and zones which will be hereinafter referred to in detail. The thickness of the rubber portions may vary; in some instances it may have a thickness of about $7/32''$ between the bottoms of the grooves and the fabric at the central portion of the tire and a thickness of about $7/16''$ between the bottom of the grooves and the tread surface 5.

Outer "side quarters" or portions of the tire are relied upon to minimize sidewise skidding and each may comprise sinusoidal laterally movable ribs 7 located between wider zones 8. These side quarters usually come into use on turns and are not normally subjected to forces and loads imposed on the central portion of the tire.

The central portion of the tire comprises a plurality of relatively wide continuous load-bearing zones 11 spaced apart from each other transversely of the tire and separated from each other by a plurality of relatively narrow continuous ribs 14. The ribs are separated from each other and from adjacent relatively wide load-bearing zones 8 or 11, as the case may be, by very narrow spaces or slits 15. As previously mentioned, the grooves or narrow spaces are relatively deep; they have the same depth as the load-bearing zones 11 and, in some cases, this may be in the neighborhood of $7/16''$ from their bottoms to the tread surface. Preferably all the ribs have their outer surfaces substantially flush with the outer surfaces of the wide load-bearing zones, as indicated in Figs. 2, 4 and 5.

The narrow ribs 14 are annularly straight and have their side walls substantially normal to the tread surface. The widths of the relatively narrow ribs 14 and the narrow spaces 15 may vary somewhat with the size of tire, but excellent results are obtainable with ribs about only $1/32''$ wide throughout their depths and spaces 15 about only $1/64''$, from which it will be clear that the spaces 15 are somewhat like knife slits separating the narrow ribs 14. The ribs 14 are like thin but deep elastic bands stood on edge intermediate the side walls of adjacent relatively wide load-bearing zones. With this relationship the annularly straight zone side walls confine the intermediate narrow ribs against substantial independent lateral distortion or squirming, but leave them free to stretch longitudinally and serve to guide them during longitudinal stretching. The relatively wide zones do not readily move as they comprise the comparatively large masses of fixedly positioned rubber that give an automobile optimum support and resistance to sidewise "swaying" or "floating" when the automobile is being driven.

If the narrow ribs were not restrained as referred to above, but were free to bend laterally or distort or squirm, they would not embody the desired ability to stretch in time to halt or minimize circumferential slippage. The time would be taken up in straightening the ribs, and during this elapsed time the load-bearing or wearing zones have had time to slip circumferentially.

The thin or narrow ribs 14 have substantially no load-bearing capacity themselves, nor any appreciably side thrust resistance, dependence being placed on the other zones for those qualities. Normally the relatively wide zones 11 of the center portion carry the load and the ribs 7 and zones 8 at the side quarters resist tendencies for the tire to move sidewise over the pavement.

When a vehicle is moving along a highway, there is a continual tendency for the tires to slip or spin circumferentially. The tendency is particularly noticeable at speeds where the tire may intermittently bounce away from the pavement. Relatively heavy and substantially unstretchable masses such as the load-bearing zones 11 tend to slide in circumferential direction over the concrete, which acts as an abrasive that wears away these zones. The faster the speed of the vehicle, the greater is the tendency to slippage, and hence the greater is the tendency to friction and abrasion, with resulting tendency to increased tire wear and gasoline consumption. With the present improved tire, however, the narrow ribs 14 between the wide zones are readily stretchable and tend to resist sliding over the concrete with adjacent wide zones; that is, when the narrow ribs are in contact with the pavement they tend to grip and "hang onto" the pavement and they stretch as other portions of the tire tend to slide over the pavement.

The above action is illustrated more or less schematically in the enlarged view of Fig. 5. The relatively wide and unstretchable load-bearing zones 11 tend to slide over the surface 12 of the underlying pavement in the direction of the arrow A, which tends to wear them away. The relatively narrow ribs 14 in contact with the pavement intermediate the zones 11 are free to stretch longitudinally around the tire and hence they tend to grip the pavement and hold on to it; they tend to hold the adjacent load-bearing zones 11 against slipping over the pavement. In Fig. 5 the narrow zones 14 are shown in contact with the surface 12 of the pavement and holding onto it as other portions 11 of the tire tend to scrape over the pavement. As a result the narrow ribs 14 tend to reduce circumferential slippage of the tire and minimize wearing away of the load-bearing zones 11. The inwardly facing walls of the load-bearing zones confine the intermediate ribs 14 against substantial lateral distortion or "bow bending" and hence limit them to the gripping function.

In addition to reducing wear on the load-carrying zones of a tire, the present improvement contributes to increased mileage per gallon of gasoline consumed, as gasoline which might otherwise be consumed by slippage of the wheels over a pavement is now devoted to actually moving the car forward, slippage being minimized. The increased mileage obtainable per gallon of gasoline is estimated to be at least 1½% and it may go as high at 5% at 60 miles per hour, tapering down to little or no saving at five miles per hour.

While two of the closely juxtaposed narrow ribs 14 may be used between relatively wide load-bearing zones, the construction illustrated with three ribs is preferable due to the excellent longitudinal stretchability and slippage-resisting tendencies provided thereby. A single rib between the load zones is not satisfactory as its side walls tend to grip against adjacent side walls of the wide zones so that the single rib tends to ride around with them as they slip over the pavement, rather than to grip the pavement and resist spinning tendencies; if the clearance between the wide zones and only a single intermediate rib is increased sufficiently to allow the rib to stretch free of the sides, squirming or lateral distortion of the rib occurs as it is not confined so as to give the desired spin-resisting grip against the pavement. If the single rib is made "heavy" in attempting to prevent lateral distortion, it lacks the necessary speed of stretch to minimize circumferential slipping.

It will be seen that the present invention provides an improved vehicle tire which is adapted to reduce both circumferential slippage and gasoline consumption. Sidewise skidding is minimized by the outer side quarters of the tire. Circumferential slipping is minimized or prevented by the relatively narrow ribs disposed between the relatively wide load-bearing zones disposed at the central portion of the tire. The plurality of narrow ribs or strips of rubber are spaced from each other and from adjacent load zone walls with the smallest practicable spacing that will permit them to stretch quickly, and the small spacing means that the narrow ribs are held against objectionable distortion or squirming transversely of the tire. The narrow intermediate ribs have their outer portions terminating substantially flush with the wide load-bearing zones but do not wear any faster than the zones which protect them at opposite sides. As a tire tends to spin or slip on the roadbed, the narrow ribs tend to hold onto the pavement and stretch longitudinally so as to resist the slippage tendency, thereby reducing friction and wear on the wide load-bearing zones. While the present tire has been described chiefly for use on vehicles such as automobiles, motorcycles and the like, it will be clear that its features are equally applicable to tires for use on aircraft.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

In a pneumatic tire of the class described, a tread comprising slotted, relatively narrow side quarters and an intervening area, said intervening area forming the major portion of the width of the tread and having a plurality of relatively wide annular load-bearing zones spaced transversely from each other across the entire intervening area, three relatively narrow annular ribs in the space between each adjacent pair of load-bearing zones having outer surfaces substantially flush with the tread surface, said ribs being on the order of 7/16" deep and on the order of 1/32" wide and separated from each orther and from said load-bearing zones by slits on the order of 1/64" wide, and each of said load-bearing zones being substantially wider than the spaces between them, whereby the intermediate one of each set of three ribs is protected by the adjacent outer ribs from gripping action by the load-bearing zones and is relatively free to stretch longitudinally around the tread and hence grip the pavement during use of the tire.

References Cited in the file of this patent

UNITED STATES PATENTS

| Number | Name | Date |
|---|---|---|
| 2,048,635 | Kraft | July 21, 1936 |
| 2,094,636 | Bull | Oct. 5, 1937 |
| 2,294,626 | Overman | Sept. 1, 1942 |
| 2,501,828 | Overman | Mar. 28, 1950 |